United States Patent
Lundén

(10) Patent No.: US 7,469,029 B2
(45) Date of Patent: Dec. 23, 2008

(54) CONTROL ROD AND A CONTROL ROD BLADE FOR A BOILING WATER REACTOR

(75) Inventor: Anders Lundén, Västerås (SE)

(73) Assignee: Westinghouse Atom AB, Vasteras (SE)

(*) Notice: Subject to any disclaimer, the term of this patent is extended or adjusted under 35 U.S.C. 154(b) by 116 days.

(21) Appl. No.: 10/479,954

(22) PCT Filed: Jun. 7, 2002

(86) PCT No.: PCT/SE02/01109

§ 371 (c)(1),
(2), (4) Date: Dec. 8, 2003

(87) PCT Pub. No.: WO02/101754

PCT Pub. Date: Dec. 19, 2002

(65) Prior Publication Data

US 2004/0196944 A1    Oct. 7, 2004

(30) Foreign Application Priority Data

Jun. 8, 2001    (SE)    ..................................... 0102033

(51) Int. Cl.
*G21C 7/00*    (2006.01)
(52) U.S. Cl. .................. 376/327; 376/333; 376/219; 376/339
(58) Field of Classification Search .................. 376/327, 376/333, 339, 219
See application file for complete search history.

(56) References Cited

U.S. PATENT DOCUMENTS

| 3,448,008 | A | * | 6/1969 | Hellman | 376/327 |
|---|---|---|---|---|---|
| 4,876,060 | A | * | 10/1989 | Yoshioka et al. | 376/333 |
| 4,888,150 | A | * | 12/1989 | Vesterlund | 376/333 |
| 5,034,185 | A | * | 7/1991 | Ueda et al. | 376/333 |
| 5,276,718 | A | * | 1/1994 | Ueda | 376/220 |
| 5,816,292 | A |   | 10/1998 | Wilson et al. |   |
| 6,285,728 | B1 | * | 9/2001 | Ueda et al. | 376/327 |
| 6,470,061 | B1 | * | 10/2002 | Helmersson | 376/333 |

OTHER PUBLICATIONS

Control Rod for Nuclear Reactor, Research Disclosure, Jul. 1992, pp. 537-538.

* cited by examiner

*Primary Examiner*—Rick Palabrica
(74) *Attorney, Agent, or Firm*—Hanify & King P.C.

(57) ABSTRACT

The present invention relates to a control rod blade for a boiling water reactor. The control rod blade (2) comprises a free edge portion with a recess (7) which comprises a plurality of outlets, arranged in a row, for channels (3), which are arranged to receive an absorber material (10) and a cover element (4) arranged to be attached along at least a section of the edge portion. The cover element (4) comprises a cover portion (12) arranged to seal the opening of the recess (7) and a support portion (13) arranged to, in a mounted state, abut a bottom surface in the recess (7) and to allow the formation of at least a passage (16) between the outlets of the channel (3) in the recess (7).

8 Claims, 3 Drawing Sheets

CONTROL ROD AND A CONTROL ROD BLADE FOR A BOILING WATER REACTOR

THE BACKGROUND OF THE INVENTION AND PRIOR ART

Figure 1:
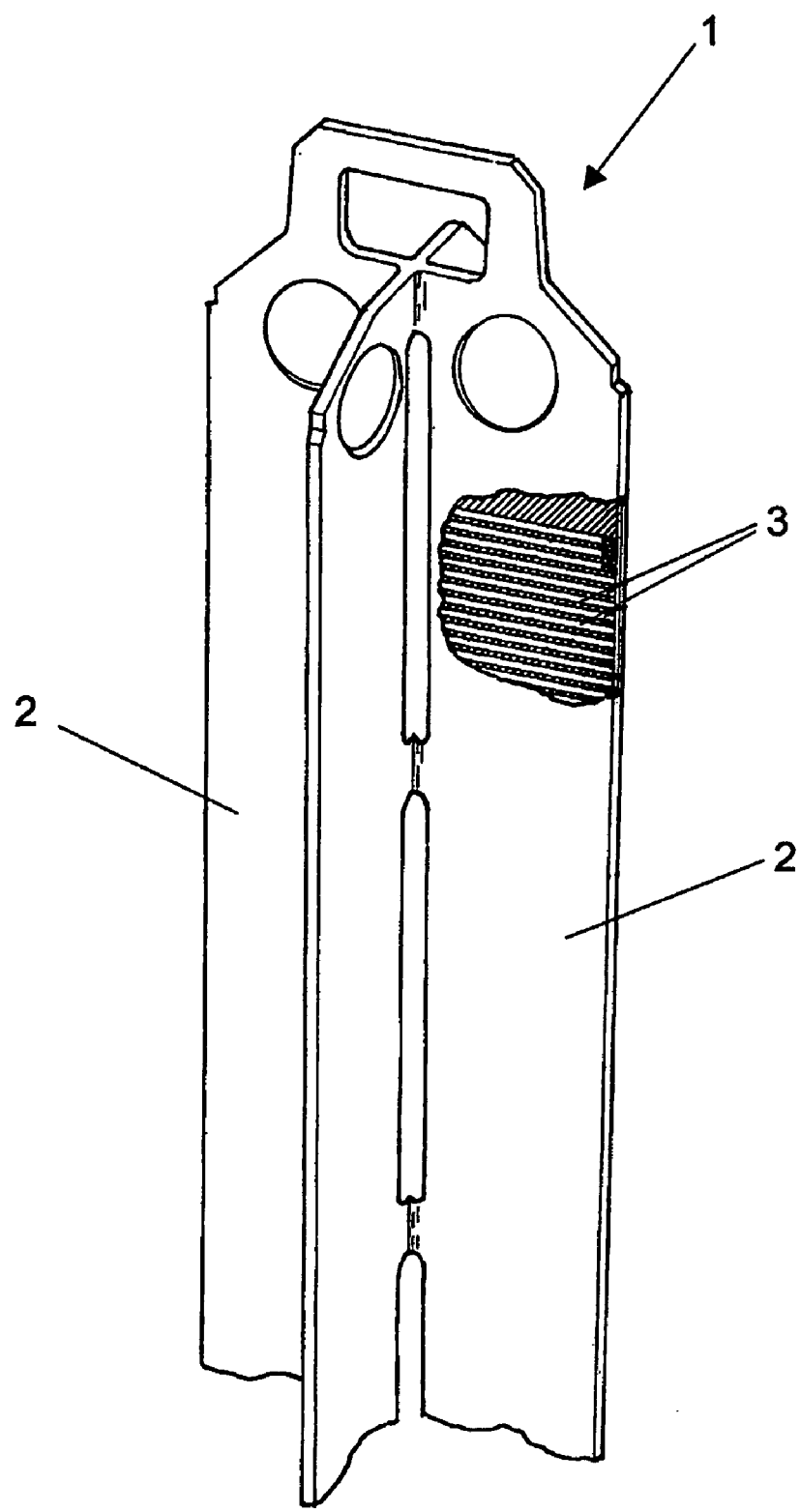

The present invention relates to a control rod and a control rod blade for a boiling water reactor, wherein the control rod blade comprises a free edge portion with a recess which comprises a plurality of outlets, arranged in a row, for channels, which are arranged to receive an absorber material and a cover element arranged to be attached along at least a section of the edge portion, which cover element comprises a cover portion arranged to seal the opening of the recess and a support portion arranged to, in a mounted state, abut a wall surface in the recess and to allow the formation of at least one passage between the outlets of the channels in the recess.

Usually, control rods for boiling water reactors (BWR) comprises a central part and four control rod blades protruding from the central part, which each is provided at a right angle in relation to the adjacent control rod blades. Usually, conventional control rod blades are manufactured of a sheet of a steel material. The control rod blades are provided with free edge portion with a longitudinally milled recess a. A plurality of channels are drilled in the recess in a row above each other. The channels have a diameter, which is less than the thickness of the metal sheet such that a satisfactory wall thickness is obtained. The channels extend from the free edge portion of the control rod blade towards the central part of the control rods. A suitable absorber material is arranged in the channels. Thereafter, the absorber material is enclosed by rolling the legs of the recess together. Thereafter, the end surfaces of the legs are welded together with a longitudinal weld joint such a hermetic and pressure resistant sealing of the recess is obtained. A relatively deep recess must here be provided at the edge portion of the control rod blade such that the legs will obtain a length such that they can be rolled together. In a welded state, the free edge portion of the control rod blade here gets a rounded shape and consequently, the absorber material has to be arranged at a not completely negligible distance from the end surface of the control rod blade. In order to increase the reactivity effect of the control rod blade, it would be desirable if the absorber material could be arranged closer to the end surface.

By a profylax published in Research Disclosure 33925/92 a control rod blade is shown, which is provided with a concave recess at a free edge portion. In order to seal the recess, a cover element, which has a substantially corresponding shape, is here applied in the recess. The cover element comprises a cover portion, which seals the opening of the recess, and a support portion, which comprises a convex contact surface arranged to abut a corresponding concave wall surface of the recess. The cover element is fixed by means of two longitudinal weld joints to the legs of the recess. The support portion comprises a chamfered portion such that a passage is formed between the chamfered wall surface of the support portion and the concave wall surface of the recess, which passage connects the outlets of the channels in the space to each other. The channels here contain a powdered absorber material. The passage allows a flow of the fission gases, which are created during operation, between the channels such that a pressure equalization is obtained. The cover element has a shape, which allows the arrangement of two further passages. These further passages are arranged substantially immediately inside the weld joints. Passages allow distribution of a protective gas to the root side of the weld joints during the welding operation. The cover element has in this case a relatively complicated construction at the same time as a concave-shaped recess results in that the outlets of the channels, at least locally, are located at a relatively large distance from the end surface of the control rod blade. The possibility to arrange the absorber material near the end surface of the control rod blade is thereby reduced.

SUMMARY OF THE INVENTION

The object of the present invention is to provide a control rod blade having a free edge portion which has a relatively simple construction such that the control rod blade may be manufactured to a low cost at the same time as the construction of the edge portion results in that the control rod blade obtains a high reactivity effect during operation.

The above-mentioned objects are achieved with the control rod blade of the initially mentioned kind, which is characterized in that the support portion has a width which is less than the width of the recess and a contact surface which is arranged to abut a bottom surface in the recess. Since the support portion has a width which is less than the width of the recess, at least on one side of the support portion, but preferably on both sides of the support portion, a passage is obtained between a side wall surface of the support portion and the side wall surface in the recess. Such a passage allows for a flow of fission gases during operation such that the pressure between the channels, which lead to the recess, is equalized. Such a cover element may be given a relatively uncomplicated shape and may by that means be manufactured to a low cost. By such co-lateral passages, the recess can be made shallow and the outlets of the channels are thus obtained at a relatively short distance from the end surface of the control rod blade. Thereby, the absorber material can also be arranged at a relatively short distance from the end surface of the control rod blade such that the control rod blade achieves a high reactivity effect during operation.

According to a preferred embodiment of the invention, the support portion has a width, which is less than the width of the outlets of the channels. Thereby, the support portion only partly covers the outlets of the channels and the created fission gases are allowed to flow past the support portion and through the passage to adjacent channels. Advantageously, the support portion has a continuos extension along the whole length of the cover element. An attachment element, which comprises a support portion with a continues extension, has a substantially constant cross-section profile along its extension, which allows for a simple manufacturing to a low cost. Such an attachment element also provides a simple mounting since no particular adaptation need to be done of the support portion in relation to the outlets of the channels for obtaining a satisfactory function. Advantageously, the cover element has a substantially T-shaped cross-section profile. Advantageously, a T-shaped cover element comprises an upper cover portion with a substantially rectangular cross-section profile with a width, which substantially covers the opening of the recess and a thickness, which allows for a pressure resistant sealing of the recess. Advantageously, the support portion also has a substantially rectangular cross-section profile with a perpendicularly downwardly extending extension in the recess from a central part of the cover portion. Such a T-shaped cover element is simple to manufacture.

According to another preferred embodiment of the invention, the support portion has a substantially plane contact surface arranged to abut a corresponding plane bottom surface in the recess. With a plane contact surface, no local cavities of the space are obtained in the contact area. Such local cavities increase the distance from the outlets of the channels to the end surface of the control rod blade and hence the distance of the absorber material to the end surface. The bottom surface of the recess may be formed as a groove in the areas, which extend between the outlets of the channels. Preferably, said groove has here a width, which corresponds to the width of the support portion. Thereby, the support portion of the cover element obtains in a simple way a correct and stable positioning in the recess during the montage. Consequently, the cover portion of the cover element covers substantially an opening of the recess in said position. However, with such a positioning, narrow slits between the edges of the cover element and the legs of the recess may be obtained. Such slits facilitates a welding of the edges of the cover element to the inner surfaces of the legs when the slits allow for distribution of a protective gas to the passage such that the protective gas may act against the underside of the formed weld.

According to another preferred embodiment of the invention, the cover element is attached to the edge portion of the control rod blade by two longitudinal weld joints. Advantageously, such weld joints may be achieved with a TIG-burner. Consequently, a T-shaped cover element provides a passage on each side of the support portion. Hence, the passages allow in addition to the pressure equalization during operation also a distribution of an inert gas to the underside of the weld during the welding operation. By such a supply of an inert gas, it is secured that the weld joints are formed with a high quality.

According to another preferred embodiment of the present invention, said absorber material consists of solid absorber bodies. Advantageously, solid absorber bodies are rod shaped and has a circular cross-section profile. Solid absorber bodies have the advantage in relation to powdered absorber material that the absorber material here does not risk to whirl up during the welding operation and to be mixed in the weld joint. Advantageously, said solid absorber bodies comprise boron carbide. Boron carbide is the most frequent absorber material and may be pressed to solid absorber rods by means of a HIP (Hot Isostatic Pressing) process. Alternatively, absorber rods of hafnium may be used. One or several absorber rods may be arranged in each of the channels. When absorber rods of boron carbide absorb neutron radiation, they expand. In order to allow for an expansion of the absorber rod in an axial direction in the channel, a spring may be arranged furthest back in the channel. Thereby, the outer end of the absorber rod can be provided relatively near the cover element without the absorber rod risking to deform the cover element during an axial expansion.

SHORT DESCRIPTION OF THE DRAWINGS

Figure 2:
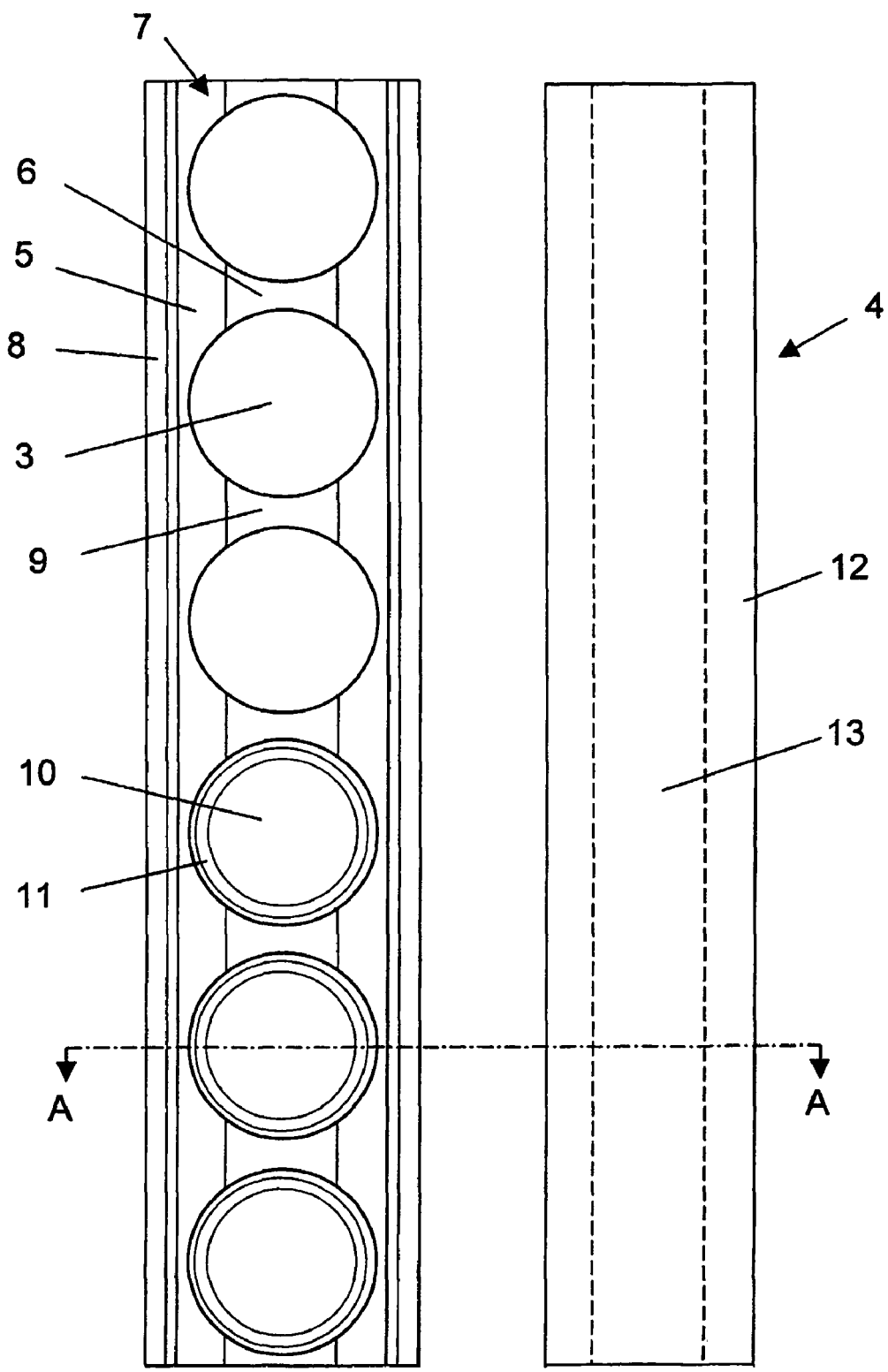
Figure 3:
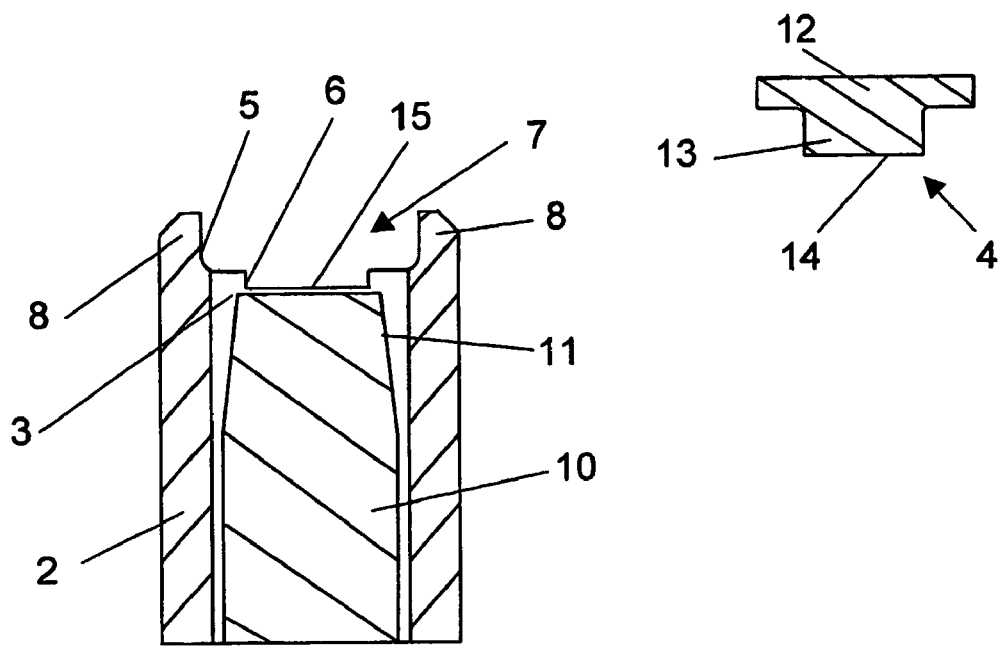
Figure 4:
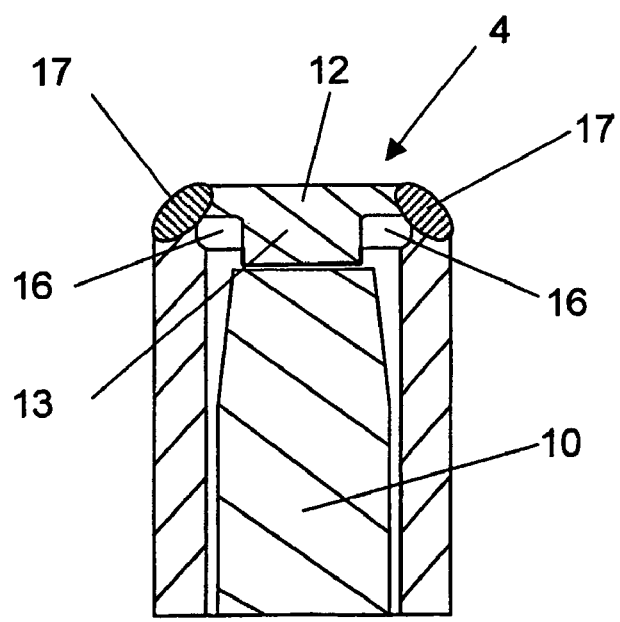

In the following, an example of a preferred embodiment of the invention is described with reference to the attached drawings, in which:

FIG. 1 shows a schematic perspective view of a control rod for a boiling water reactor, FIG. 2 shows an edge portion of a control rod blade and a cover element according to the present invention, FIG. 3 shows a sectional view along the line A-A in FIG. 2 and FIG. 4 shows a sectional view of an edge portion of a control rod blade having a mounted cover element.

DETAILED DESCRIPTION OF AN EMBODIMENT OF THE INVENTION

FIG. 1 shows a control rod 1 for controlling of the neutron flux in a boiling water reactor (BWR). The control rod 1 comprises four control rod blades 2, which are directed in a right angle in relation to the adjacent control rod blades 2. The control rod blades 2 comprise a plurality above each other, in a row, drilled channels 3, which extend between a free edge portion of the control rod blades 2 and a center, where the control rod blades 2 meet. The control rod blades 2 are manufactured of a sheet material, which preferably is of steel and has a thickness of 7-8 mm. The channels 3, which are drilled in the control rod blades 2 may here have a diameter of 5-6 mm.

FIG. 2 shows both an edge portion of a control rod blade 2 before it is enclosed and a cover element 4 for sealing the edge portion. Consequently, the control rod blade comprises a sheet material the free end surface of which is provided with a first U-shaped track 5 by means of a milling operation. The first track 5 has a constant width during its extension along substantially the whole free end surface of the sheet material. Thereafter, a second narrower U-shaped track 6 has been milled centrally in the first U-shaped track 5. The second track 6 also has a constant width during its extension along substantially the whole free end surface of the sheet material. The first 5 and second 6 U-shaped tracks together form a recess 7 in the free edge portion of the control rod blade 2. The recess 7 is restricted laterally by legs 8 having a suitable wall thickness. After or before the manufacturing of the recess 7, a large number of straight channels 3 with a circular cross section have been drilled in the control rod blade 2. Consequently, the channels 3 extend between the free edge portion of the control rod blade 2 and a center, where the control rod blades 2 meet. The channels 3 have a diameter, which is less than the width of the first U-shaped track 5 but which exceeds the width of the second U-shaped track 6. The centrally arranged second U-shaped track 6 thus obtains only an extension in the surface areas 9 which are formed between the outlets of the channels 3 in the recess 7. FIG. 2 shows outlets of six drilled channels 3. The three lowest located channels 3 have here been provided with absorber material in the form of solid absorber rods 10, which, with advantage, are manufactured of boron carbide. The absorber rods 10 have a smaller diameter than the channels 3 such they are allowed to expand radially when they are subjected to radiation during operation. A spring, which is not shown in the figures, is arranged furthest back in the channels 3 such that the absorber rods 10 with a yielding pressure are held in the direction towards the outlets of the channels. The absorber rods 10 are allowed to expand axially in the channels 3 against the action of the spring. The absorber rods 10 comprise a chamfering 11 such that its thickness decreases at the outer end. Since the end surface of the absorber rods 10 is also subjected to radiation, the absorber rods are subjected to the greatest radiation dose at the outer end. By such a chamfering 11, one secures that the absorber rod 10 in this area does not obtain a radial extension such the absorber rod 10 will abut the surrounding channel wall.

FIG. 2 thus show also the cover element 4, which is arranged to seal the recess 7 such that the control rod blade 2 obtains an external even end surface. The cover element 4 comprises a length, which corresponds to the length of the recess 7, and has a cover portion 12, which has a width corresponding to the width of the first U-shaped track 5. The upper surface of the cover portion 12 is arranged to substantially form the end surface of the control rod blade in a mounted state. A support portion 13 of the cover element 4 is marked in FIG. 2 with broken lines. The support portion 13 has a continuos extension along the whole length of the cover element 4 and has a width which substantially corresponds to the width of the second track 6.

FIG. 3 shows a sectional view along the line A-A in FIG. 2. Here, the first U-shaped track 5 and the design and the depth of the second U-shaped track 6 are more evident than in FIG. 2. The cover element 4 has a substantially T-shaped cross-section profile. The cover portion 12 of the cover element 4 comprises a substantially upper rectangular cross section area with a wall thickness dimensioned for enclosing fission gases with a specific pressure and a width which substantially corresponds to the width of the opening of the recess 7. The support portion 13 of the cover element 4 comprises a lower substantially rectangular cross section area, which has a width substantially corresponding to the width of the second U-shaped track 6. The support portion 13 has a height such that a plane lower contact surface 14 abuts a corresponding plane bottom surface 15 of the second U-shaped track 6 when the upper surface of the cover portion 12 is on a level with the end surface of the legs 8. An absorber rod 10 having a chamfering 11 at the end is arranged in the channel 3.

FIG. 4 shows a cross section view of an edge portion of a control rod blade 2 with a mounted cover element 4. Since the support portion 13 has a width which is less than the width of the recess 7, passages 16 are obtained on both sides of the support portion 13, which extend along the recess 7. The passages 16 connect the outlets of the channels 3 to each other and thereby allow for a flow of fission gases between the channels 3 during operation. The overpressure, which is created by the fission gases during operation, may thereby be distributed substantially uniformly between all the channels 3, which lead to the space 7 of the control rod blade 2.

The second U-shaped track 6 thus has a width, which substantially corresponds to the width of the support portion 13. Thereby, the cover element 4 obtains, during the montage, a stable positioning in the recess 7 such narrow uniform slits are formed on both sides of the cover element 4 between the edges of the cover portion 12 and the legs 8 of the recess 7. Such slits allow for the distribution of a protective gas to the passages 16 during a welding operation of the edges of the cover portion 12 to the inner surfaces of the legs 8. The cover element 4 is here attached in the recess 7 by means of two longitudinal weld joints 17. Advantageously, such weld joints 17 may be provided with a TIG-burner. Consequently, a T-shaped cover element 4 provides a passage 16 on both sides of the support portion 13. The passages 16 allow, in addition to the above mentioned pressure equalization function during operation, hence also for a distribution of an inert gas to root side of the weld joint during the welding operation. By such a supply of an inert gas, it is secured that the weld joints 17 obtain a high quality.

The present invention is not in any way restricted to the embodiment shown in the drawings but may be freely modified within the scope of the claims. The recess does not necessarily need to consist of two U-shaped tracks but may have a substantially arbitrary but functional shape.

The invention claimed is:

1. A control rod blade for a boiling water reactor, wherein the control rod blade comprises a free edge portion with a recess having an opening and a wall surface, which comprises a plurality of outlets, arranged in a row in the wall surface, for channels, which are arranged to receive an absorber material and a cover element arranged to be attached along the free edge portion of the control rod blade, which cover element comprises a cover portion arranged to seal the opening of the recess and a support portion which has a contact surface arranged to, in a mounted state, abut a bottom surface of the wall surface in the recess and to form at least one passage between the outlets of the channels in the recess, the cover portion further being arranged to form an external end surface of the control rod blade in a mounted state, wherein the support portion has a width which is less than the width of the recess and the outlet of the channels such that at least one passage between the outlets of the channels in the recess is formed, characterized in that the support portion has a substantially plane contact surface which is arranged to abut a corresponding plane bottom surface in the recess, and wherein the cover element has a substantially T-.shaped cross-section profile.

2. The control rod blade according to claim 1, wherein the support portion has a continuous extension along a whole length of the cover element.

3. The control rod blade according to claim 1, wherein the bottom surface is shaped as a groove in areas that extend between the outlets of the channel.

4. The control rod blade according to claim 3, wherein the groove has a width which substantially corresponds to the width of the support portion.

5. The control rod blade according to claim 1, wherein the cover element is attached to the edge portion of the control rod blade by two longitudinal weld joints.

6. The control rod blade according to claim 1, wherein said absorber material consists of solid absorber bodies.

7. The control rod blade according to claim 6, wherein said solid absorber bodies comprise boron carbide.

8. The control rod for a boiling water reactor comprising at least a control rod blade according to claim 1.

* * * * *